United States Patent [19]

Leupin et al.

[11] Patent Number: 5,882,359
[45] Date of Patent: Mar. 16, 1999

[54] VAT DYE MIXTURES, PROCESSES FOR THEIR PREPARATION AND THEIR USE FOR DYEING CELLULOSIC FIBRE MATERIALS

[75] Inventors: Peter Leupin, Allschwil; Roland Zoelper, Basel, both of Switzerland

[73] Assignee: Ciba Specialty Chemicals Corporation, Tarrytown, N.Y.

[21] Appl. No.: 903,932

[22] Filed: Jul. 31, 1997

Related U.S. Application Data

[63] Continuation of Ser. No. 675,028, Jul. 3, 1996, abandoned.

[30] Foreign Application Priority Data

Jul. 10, 1995 [CH] Switzerland .............................. 2006/95
Feb. 8, 1996 [CH] Switzerland .............................. 0325/96

[51] Int. Cl.$^6$ ...................................................... D06P 1/24
[52] U.S. Cl. ........................... 8/642; 8/643; 8/677; 8/918; 8/532; 8/927
[58] Field of Search ................... 8/642, 643, 677; 544/188

[56] References Cited

U.S. PATENT DOCUMENTS

| | | |
|---|---|---|
| 3,839,332 | 10/1974 | Moergeli ............................ 260/249 |
| 4,329,456 | 5/1982 | Tzikas ................................. 544/113 |
| 4,348,239 | 9/1982 | Wick ................................. 8/643 X |
| 5,210,190 | 5/1993 | Helwig et al. ..................... 544/187 |

FOREIGN PATENT DOCUMENTS

| | | |
|---|---|---|
| 0025166 | 3/1981 | European Pat. Off. . |
| 0057381 | 8/1982 | European Pat. Off. . |
| 25166 | 10/1983 | European Pat. Off. . |
| 2128369 | 10/1972 | France . |
| 3613066 | 10/1987 | Germany . |
| 784926 | 10/1957 | United Kingdom . |
| 1121974 | 7/1968 | United Kingdom . |
| 2034735 | 6/1980 | United Kingdom . |

OTHER PUBLICATIONS

Chemical Abstracts, 100: 0532,01f of DE 3,211,300 Sep. 1983.
Chemical Abstracts, 103: 7741 w of CS 216, 361 Jul. 1984.
Chemical Abstracts, 95: 063680 d of EP 25,166 Mar. 1981.
Chemical Abstracts, 78: 005405f of DE 2,209,443 Sep. 1972.
Chemical Abstracts, 97: 218030j of EP 57,381 Aug. 1982.
Chemical Abstracts, 108: 133344k of DE 361066 Oct. 1987.

*Primary Examiner*—Margaret Einsmann
*Attorney, Agent, or Firm*—Kevin T. Mansfield; David R. Crichton; Jacob M. Levine

[57] ABSTRACT

Vat dye mixtures comprising at least two structurally different dyes which have the formula

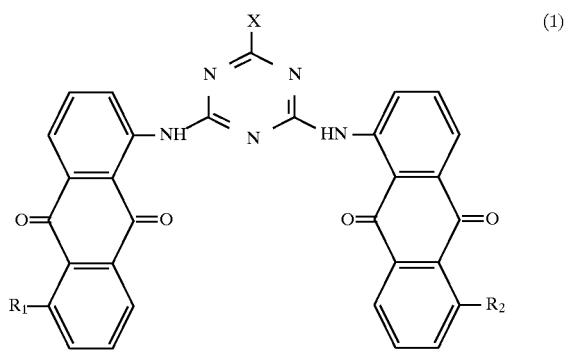

in which X is phenyl which is unsubstituted or substituted by $C_1$–$C_4$alkyl, $C_1$–$C_4$alkoxy or halogen; morpholino; or the radical —$SR_3$; $R_1$ and $R_2$ independently of one another are each hydrogen or the radical —NHCO—$C_6H_5$, and $R_3$ is $C_1$–$C_4$alkyl, or phenyl which is unsubstituted or substituted by $C_1$–$C_4$alkyl or halogen, which are suitable for dyeing cellulosic fiber materials and give dyeings with good all-round properties, are described.

14 Claims, No Drawings

VAT DYE MIXTURES, PROCESSES FOR THEIR PREPARATION AND THEIR USE FOR DYEING CELLULOSIC FIBRE MATERIALS

This application is a continuation of Ser. No. 08/675,028, filed Jul. 3, 1997, now abandoned.

The present invention relates to vat dye mixtures, processes for their preparation and their use for dyeing cellulosic fibre materials.

Vat dyes and their use for dyeing cellulosic fibre materials have been known for a long time. However, the existing vat dyes and vat dye mixtures often do not meet the recently increased requirements to the full extent, in particular in respect of a broader range of shades.

The object of this invention was therefore to provide novel vat dye mixtures which meet the current requirements.

It has been found that this object can be achieved with the vat dye mixtures according to the invention.

The present Application thus relates to a vat dye mixture comprising at least two structurally different dyes, each of which have the formula

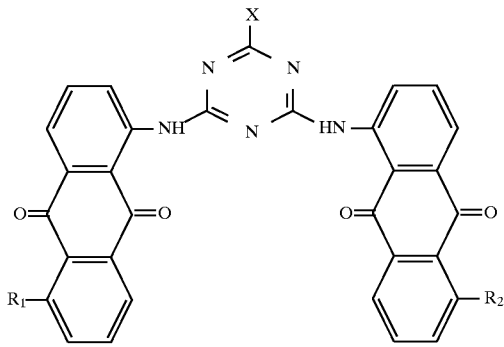

(1)

in which X is phenyl which is unsubstituted or substituted by $C_1$–$C_4$alkyl, $C_1$–$C_4$alkoxy or halogen; morpholino; or the radical —$SR_3$; $R_1$ and $R_2$ independently of one another are each hydrogen or the radical —NHCO—$C_6H_5$, and $R_3$ is $C_1$–$C_4$alkyl, or phenyl which is unsubstituted or substituted by $C_1$–$C_4$alkyl or halogen.

In the formnula (1), $C_1$–$C_4$alkyl is methyl, ethyl, n-propyl, isopropyl, n-butyl, isobutyl, sec-butyl or tert-butyl.

In the formula (1), $C_1$–$C_4$alkoxy is methoxy, ethoxy, propoxy, isopropoxy, n-butoxy, isobutoxy, sec-butoxy or tert-butoxy.

In the formula (1), halogen is, for example, chlorine, bromine or iodine.

X is preferably unsubstituted phenyl or morpholino.

Important vat dye mixtures are those comprising a dye of the formula (1) in which X is phenyl which is unsubstituted or substituted by $C_1$–$C_4$alkyl, $C_1$–$C_4$alkoxy or halogen; $R_1$ is hydrogen and $R_2$ is the radical —NHCO—$C_6H_5$, and a dye of the formula (1) in which X is phenyl which is unsubstituted or substituted by $C_1$–$C_4$alkyl, $C_1$–$C_4$alkoxy or halogen; and $R_1$ and $R_2$ are each the radical —NHCO—$C_6H_5$.

Preferred vat dye mixtures are those comprising the dye of the formula

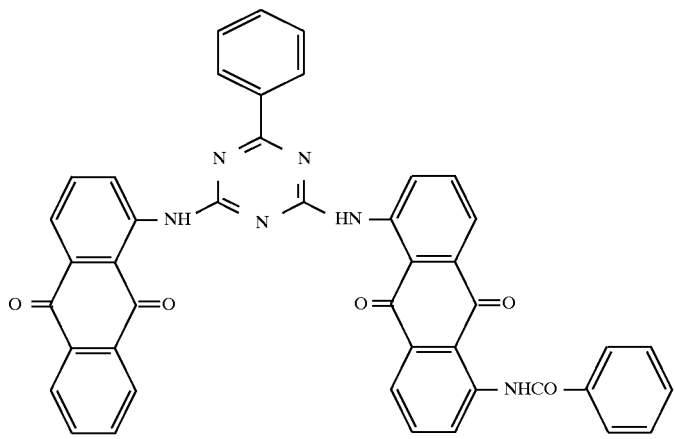

(2)

and the dye of the formula

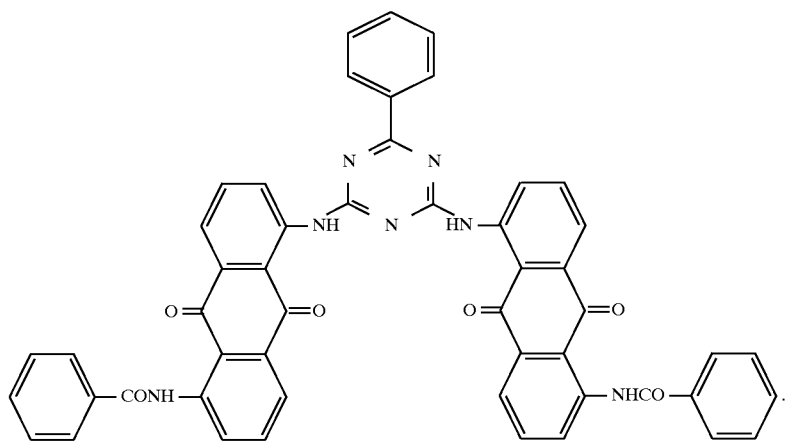

(3)

Vat dye mixtures which are likewise preferred are those comprising the dye of the formula

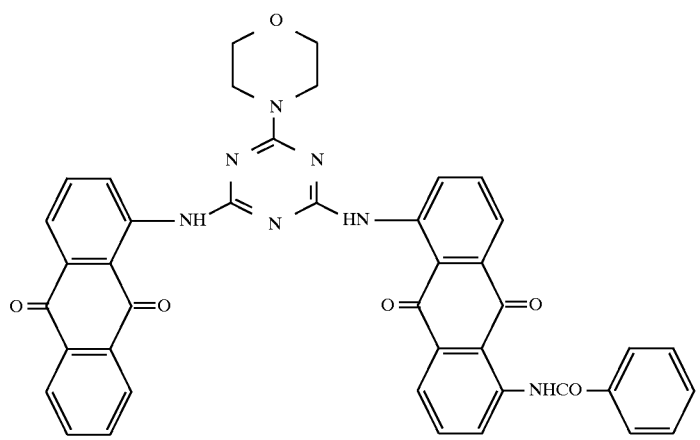

(4)

and the dye of the formula

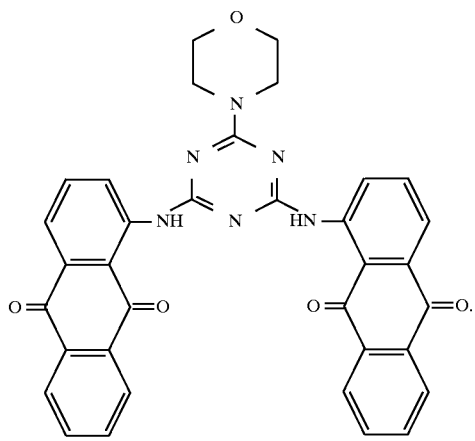

(5)

Particularly preferred vat dye mixtures are those comprising 10 to 90% by weight of the vat dye of the formula (2) and 90 to 10% by weight of the vat dye of the formula (3).

Vat dye mixtures which are likewise particularly preferred are those comprising 10 to 90% by weight of the vat dye of the formula (4) and 90 to 10% by weight of the vat dye of the formula (5).

The vat dye mixture comprising 70% by weight of the vat dye of the formula (2) and 30% by weight of the vat dye of the formula (3) is especially preferred.

The vat dye mixture comprising 60% by weight of the vat dye of the formula (4) and 40% by weight of the vat dye of the formula (5) is likewise especially preferred.

The dyes of the formulae (2) to (5) are known or can be prepared by known methods.

The vat dye mixtures according to the invention are prepared from known starting substances by known methods, for example by reacting 2-phenyl-4,6-dichlorotriazine with 1-aminoanthraquinone and 1-amino-5-benzoylaminoanthraquinone, the ratio of 1-aminoanthraquinone to 1-amino-5-benzoylaminoanthraquinone being chosen according to the desired content of the two individual dyes in the vat dye mixture, or by first reacting 2-phenyl-4,6-dichlorotriazine with 1-aminoanthraquinone and 1,5-diaminoanthraquinone, the ratio of 1-aminoanthraquinone to 1,5-diaminoanthraquinone being chosen according to the desired content of the two individual dyes in the vat dye mixture, and then reacting the resulting intermediate with benzoyl chloride, or by first reacting cyanuric chloride with 1-aminoanthraquinone and 1-amino-5-benzoylaminoanthraquinone, the ratio of 1-aminoanthraquinone to 1-amino-5-benzoylaminoanthraquinone being chosen according to the desired content of the two individual dyes in the vat dye mixture, and then reacting the resulting intermediate with morpholine.

The vat dye mixtures according to the invention are advantageously prepared in organic solvents, for example higher-boiling aliphatic hydrocarbons, N,N-dimethylacetamide, N-methyl-2-pyrrolidone, 1,3-dimethyl-2-imidazolidinone, tetramethylurea, dimethylformamide, xylene, phenol, trichlorobenzene, nitrobenzene or methyl benzoate.

The preferred solvent is nitrobenzene.

Suitable cellulosic fibre materials are, in particular, non-pretreated cellulose, for example hemp, linen, jute and natural cotton, and fibre mixtures, for example those of polyacrylonitrile/cotton or polyester/cotton, and fibre materials based on regenerated cellulose (viscose) are furthermore also suitable. The cellulosic material can be in widely varying processing forms here, for example as loose material, yarn, woven fabric, a nonwoven or knitted fabric.

The amount of vat dye mixture added to the dye liquor depends on the desired tinctorial strength. In general, amounts of 0.001 to 10, preferably 0.01 to 3 per cent by weight, based on the weight of the cellulosic fibre material employed, have proved appropriate.

In addition to one of the vat dye mixtures according to the invention, the dye liquors comprise the auxiliary chemicals customary for vat dyeing. These are, for example, alkali, such as sodium carbonate, potassium hydroxide or sodium hydroxide, or alkali donors, for example sodium chloroacetate. Sodium hydroxide is preferred. They also include reducing agents, hydrosulfite preferably being used.

The dye liquor can additionally also comprise other customary dyeing auxiliary products, for example electrolytes, such as sodium chloride or sodium sulfate, or commercially available wetting agents, levelling agents and dispersants.

The vat dye mixtures according to the invention can be applied from an aqueous solution by the padding or exhaust methods customary in vat dyeing. The exhaust method is preferred. The liquor ratio depends on the circumstances of the apparatus, on the substrate and on the make-up form. However, it can be chosen within a wide range, for example 1:4 to 1:100, but is preferably between 1:6 and 1:20.

The dyeing process can be carried out at temperatures from 20° to 110° C. The temperature is preferably between 30° and 100° C., in particular between 30° and 80° C.

After the dyeing, the dyed cellulosic material is soaped in the customary manner. For this, the substrate is treated at boiling point in a solution which comprises soap or synthetic detergent and, if appropriate, sodium carbonate.

Level and strong yellow dyeings which are distinguished by good colour yields and good light and wet fastness properties are obtained with the vat dye mixtures according to the invention.

The following examples serve to illustrate the invention. In these examples, parts are parts by weight and percentages are percentages by weight. The temperatures are stated in degrees Celsius. Parts by weight bear the same relation to parts by volume as the gram to the cubic centimeter.

EXAMPLE 1

40.3 g of 98.2% 2-phenyl-4,6-dichlorotriazine, 29.7 g of 98.6% 1-aminoanthraquinone, 82.6 g of 90.6% 1-amino-5-benzoylaminoanthraquinone and 1050 ml of nitrobenzene are initially introduced into a 2 l reaction vessel, under a nitrogen atmosphere, and are heated up to a temperature of 100°–105° C. and stirred for 6 hours.

The reaction mass, which changes via a dark solution into an orange suspension, is then heated up to 140°–145° C. and subsequently stirred at this temperature for 15 hours.

The orange-red suspension formed is then cooled to room temperature and filtered. The precipitate is first washed with nitrobenzene until a pale-coloured filtrate results, and is then washed with ethyl alcohol until the filtrate becomes nitrobenzene-free and water-clear.

Thereafter, the precipitate is washed with water until the pH is neutral and dried.

138.7 g of a condensation product which comprises about 75% of the dye of the formula (2) and about 25% of the dye of the formula (3) are obtained.

EXAMPLE 2

55.4 g of cyanuric chloride, 95.1 g of 98.6% 1-aminoanthraquinone and 68.0 g of 90.6% 1-amino-5-benzoylaminoanthraquinone are suspended in 2000 ml of nitrobenzene in a 3 l reaction vessel, under a nitrogen atmosphere, and the suspension is heated up to a temperature of 100°–105° C. and stirred for 6 hours.

The reaction mass is then heated up to 140°–145° C. and subsequently stirred at this temperature for 15 hours. Thereafter, 149.8 g of morpholine are added and the reaction mass is subsquently stirred at 140°–145° C. for a further 8 hours.

The resulting orange suspension is then cooled to room temperature and filtered. The precipitate is first washed with nitrobenzene until a pale-coloured filtrate results, and is then washed with ethyl alcohol until the filtrate becomes nitrobenzene-free and water-clear.

Thereafter, the precipitate is washed with water until the pH is neutral and dried.

191.1 g of a condensation product which comprises about 60% of the dye of the formula (4) and about 40% of the dye of the formula (5) are obtained.

EXAMPLE 3

34.50 g of 98.2% 2-phenyl-4,6-dichlorotriazine and 27.15 g of 98.6% 1-aminoanthraquinone in 600 ml of nitrobenzene are initially introduced into a 750 ml reaction vessel, under a nitrogen atmosphere, and are heated up to a temperature of 100°–105° C. and stirred for 3 hours (reaction mass A).

In the meantime, 42.48 g of 96.9% 1,5-diaminoanthraquinone in 500 ml of nitrobenzene are initially introduced into a 1.5 l reaction vessel, under a nitrogen atmosphere, and are heated up to a temperature of 140°–145° C. (reaction mass B).

Reaction mass A is now metered into reaction mass B in the course of 1 hour, the reaction temperature in the 1.5 l reaction vessel being kept at 140°–145° C.

The 750 ml reaction vessel is then rinsed with 50 ml of nitrobenzene.

The combined reaction masses A and B are now kept at 140°–142° C. in the 1.5 l reaction vessel under a nitrogen atmosphere for 6 hours. Thereafter, 30.30 g of benzoyl chloride are added and the contents of the reactor are subsequently stirred at 140°–142° C. under a nitrogen atmosphere for 15 hours.

The orange-red suspension formed is then cooled to room temperature and filtered. The precipitate is first washed with nitrobenzene until a pale-coloured filtrate results, and is then washed with ethyl alcohol until the filtrate becomes nitrobenzene-free and water-clear.

Thereafter, the precipitate is washed with water until the pH is neutral and dried.

102.50 g of a condensation product which comprises about 80% of the dye of the formula (2) and about 20% of the dye of the formula (3) are obtained.

EXAMPLE 4

A piece of 10 g of cotton tricot is prewetted in water, heated to about 70°–80° C., for 10 minutes and then brought to a moisture content of about 60% by weight, calculated with respect to the weight of the cotton tricot, by means of a laboratory spin-drier. The cotton tricot prepared in this way is treated in an Ahiba® laboratory dyeing apparatus, at 30° C. and at a liquor ratio of 1:10, with a liquor comprising 0.25 g of a vat dye mixture comprising:

0.175 g of the vat dye of the formula (2) and 0.075 g of the vat dye of the formula (3), 2 g/l of a commercially available levelling agent, 12 ml/l of a 30% sodium hydroxide solution, 4 g/l of sodium hydrosulfite and 14 g/l of sodium chloride.

After addition of the cotton tricot, the temperature of the liquor is increased to 50° C. in the course of 15 minutes and maintained for 45 minutes. Thereafter, the cotton tricot is removed from the dyebath, rinsed with water and oxidized for 20 minutes at 50° C. with an aqueous solution comprising 5 ml/l of 30% $H_2O_2$.

The cotton tricot is then rinsed with water and soaped for 20 minutes at 90° to 100° C. with an aqueous solution comprising 1 g/l of a commercially available detergent and wetting agent and 1 g/l of calcined sodium carbonate.

Thereafter, the cotton tricot is rinsed with hot and cold water and dried.

A golden orange dyeing with very good fastnesses to light and washing is obtained.

What is claimed is:

1. A vat dye mixture comprising at least two structurally different dyes, each of which have the formula

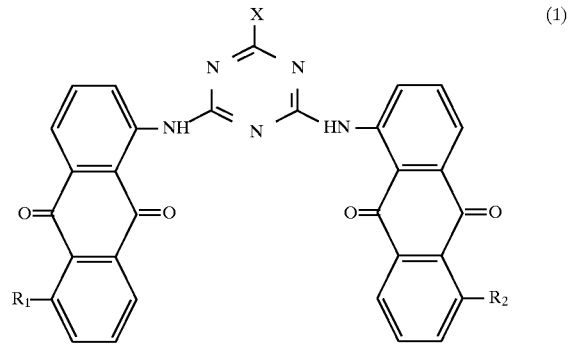

in which X is phenyl which is unsubstituted or substituted by $C_1$–$C_4$alkyl, $C_1$–$C_4$alkoxy or halogen, morpholino, or the radical —$SR_3$, $R_1$ and $R_2$ independently of one another are each hydrogen or the radical —NHCO—$C_6H_5$, and $R_3$ is $C_1$–$C_4$alkyl, or phenyl which is unsubstituted or substituted by $C_1$–$C_4$alkyl or halogen.

2. A vat dye mixture according to claim 1, comprising a dye of the formula (1) in which X is phenyl which is unsubstituted or substituted by $C_1$–$C_4$alkyl, $C_1$–$C_4$alkoxy or halogen; $R_1$ is hydrogen and $R_2$ is the radical —NHCO—$C_6H_5$, and a dye of the formula (1) in which X is phenyl which is unsubstituted or substituted by $C_1$–$C_4$alkyl, $C_1$–$C_4$alkoxy or halogen; and $R_1$ and $R_2$ are each the radical —NHCO—$C_6H_5$.

3. A vat dye mixture according to claim 2, comprising the dye of the formula

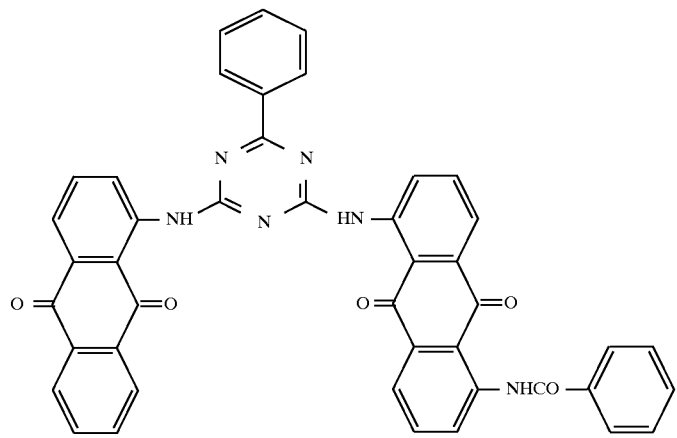

and the dye of the formula

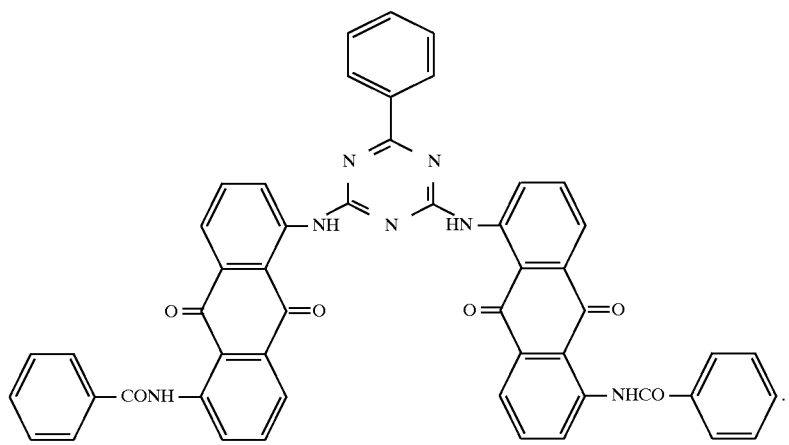

(3)

4. A vat dye mixture according to claim 1, comprising the dye of the formula

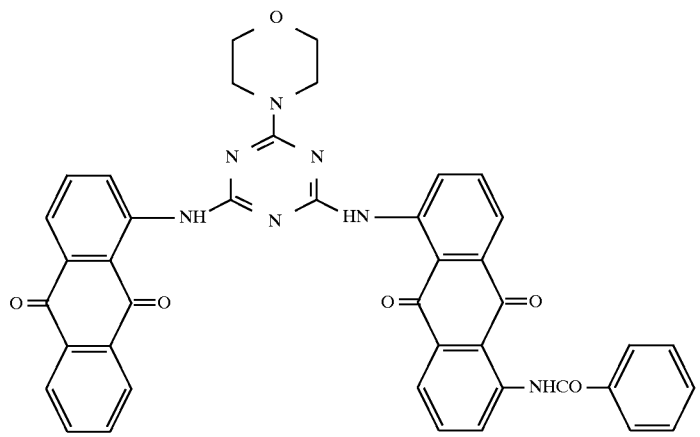

(4)

and the dye of the formula

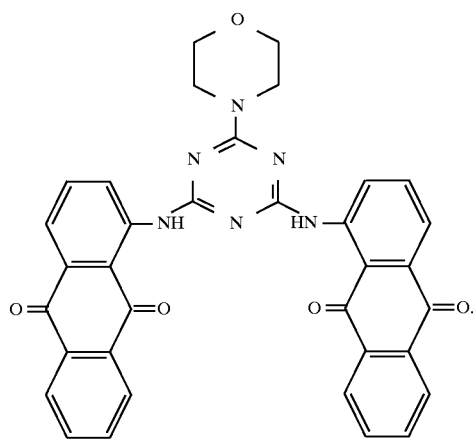

(5)

5. A vat dye mixture according to claim 3, comprising 10 to 90% by weight of the vat dye of the formula (2) and 90 to 10% by weight of the vat dye of the formula (3).

6. A vat dye mixture according to claim 4, comprising 10 to 90% by weight of the vat dye of the formula (4) and 90 to 10% by weight of the vat dye of the formula (5).

7. A vat dye mixture according to claim 5, comprising 70% by weight of the vat dye of the formula (2) and 30% by weight of the vat dye of the formula (3).

8. A vat dye mixture according to claim 6, comprising 60% by weight of the vat dye of the formula (4) and 40% by weight of the vat dye of the formula (5).

9. A process for the preparation of a vat dye mixture according to claim 3, which comprises reacting 2-phenyl-4,6-dichlorotriazine with 1-aminoanthraquinone and 1-amino-5-benzoylaminoanthraquinone, the ratio of 1-aminoanthraquinone to 1-amino-5-benzoylaminoanthraquinone being chosen according to the desired content of the two individual dyes in the vat dye mixture.

10. A process for the preparation of a vat dye mixture according to claim 3, which comprises first reacting 2-phenyl-4,6-dichlorotriazine with 1-aminoanthraquinone and 1,5-diaminoanthraquinone, the ratio of 1-aminoanthraquinone to 1,5-diaminoanthraquinone being chosen according to the desired content of the two individual dyes in the vat dye mixture, and then reacting the resulting intermediate with benzoyl chloride.

11. A process for the preparation of a vat dye mixture according to claim 4, which comprises first reacting cyanuric chloride with 1-aminoanthraquinone and 1-amino-5-benzoylaminoanthraquinone, the ratio of 1-aminoanthraquinone to 1-amino-5-benzoylaminoanthraquinone being chosen according to the desired content of the two individual dyes in the vat dye mixture, and then reacting the resulting intermediate with morpholine.

12. A method for dyeing cellulosic fiber with a vat dye mixture comprising contacting said cellulosic fiber with a vat dye mixture according to claim 1.

13. A method according to claim 12, wherein the cellulosic fibre material is cotton, polyacrylonitrile/cotton blend, polyester/cotton blend or viscose.

14. A method according to claim 13, wherein cotton is used.

* * * * *